June 14, 1955  R. W. LOGAN ET AL  2,710,909
ELECTRIC HEATING ELEMENT

Filed Nov. 16, 1953  2 Sheets-Sheet 1

INVENTORS:
RICHARD W. LOGAN
BENJAMIN C. LIEBENTHAL

BY
ATT'YS

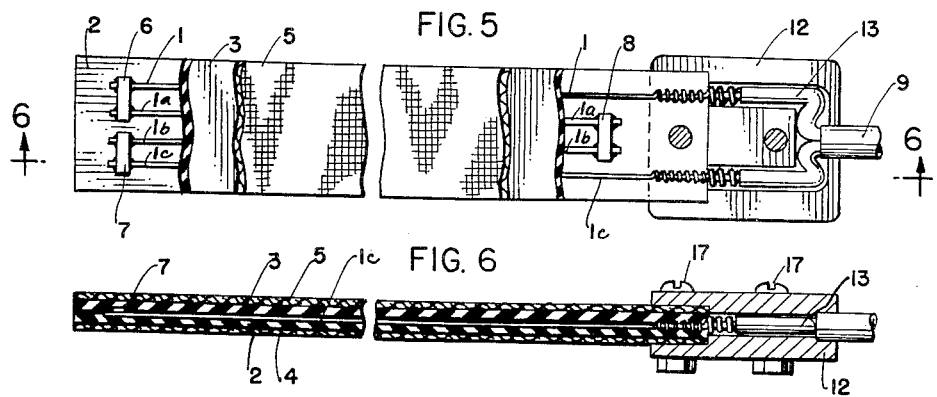
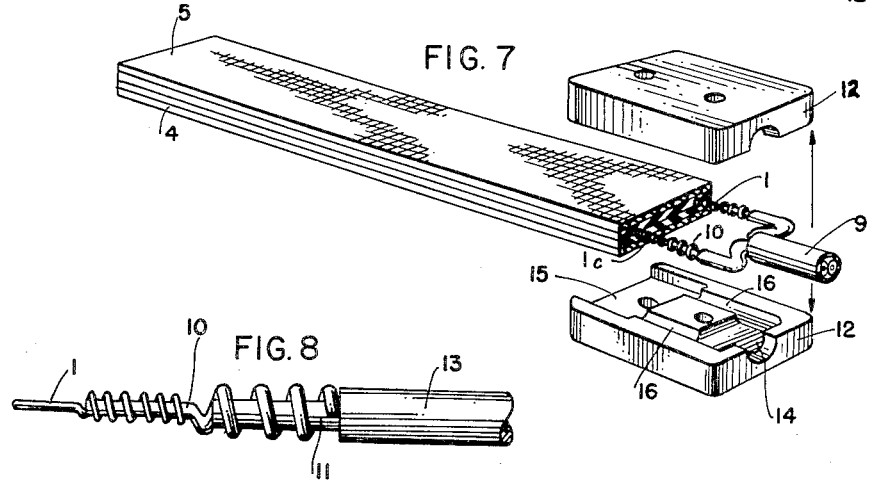
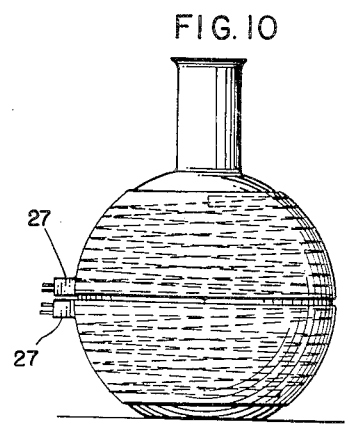
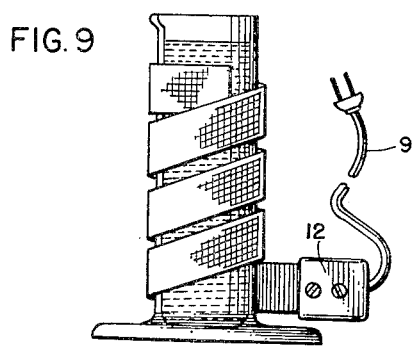

United States Patent Office 2,710,909
Patented June 14, 1955

2,710,909

ELECTRIC HEATING ELEMENT

Richard W. Logan and Benjamin C. Liebenthal,
Downers Grove, Ill.

Application November 16, 1953, Serial No. 392,300

4 Claims. (Cl. 219—46)

This invention relates to insulated electric heating elements in the form of pliable sheets, strips, or tapes and particularly to such heating elements capable of being wrapped around, or applied in surface contact with articles to be heated.

The main objects of this invention are to provide an improved flexible insulated electric heating element; to provide an improved electric heating means adapted for surface contact with an object to be heated; to provide an improved electric heating element of the sheet or tape form; to provide a simplified construction for insulated electric heating elements; to provide an improved flexible insulated electric heating element that is highly resistant to chemicals, oils and moisture; to provide such a heating element having a more rapid heat response; to provide such a heating element that is of more rugged construction and that is capable of withstanding more physical abuse than similar devices heretofore used; to provide an improved electric heating element that is more convenient to use and apply; and to provide an improved flexible insulated electric heating element that is easy and cheap to manufacture and which can be sold at a relatively low price.

A specific embodiment of this invention is shown in the accompanying drawings in which:

Fig. 5 is a plan view of an improved heating tape, with parts broken away, showing the manner of connecting parallel resistance element in series and an arrangement for connecting the same to an electric conductor or line.

Fig. 6 is a sectional view of the same as taken on line 6—6 of Fig. 5.

Fig. 7 is a perspective view of the same with the connector block opened and the end of the tape cut away to show the manner of connecting the resistance wires to the conductor leads before the connector block is applied.

Fig. 8 is an enlarged fragmentary detail showing an improved arrangement for connecting a resistance wire to a conductor lead.

Fig. 9 is a view showing one manner of using the improved heating element for heating the contents of a glass jar.

Fig. 10 is a view showing the improved heating element as a molded form to fit the body of a spherical beaker.

In the form shown the improved heating element comprises a plurality of parallel resistance wires suitably connected in series and permanently sandwiched between two sheets of layers of flexible reinforced dielectric material preferably made of a pliable substance having high thermal conductivity and high resistance to oils, acids and moisture. Preferably the wires are "Nichrome" resistance wires of uniform gage and the heat conducting dielectric sheet material is made of a semi-vulcanized or partially cured rubber-like substance, such as silicone rubber, laminated on one side with a layer of glass cloth. The two sheets are brought together, face to face, with the wires between and the glass cloth surface outermost and, because of the partially cured or semi-vulcanized state of the material, the substance flows around the wires and the two layers tend to bond with each other to form a fairly stable unitary structure. The resistance wires are then suitably connected to the leads of an electric conductor cord or cable and when current is applied the heat generated by the resistance wires completes the curing of the sheet material and vulcanizes the sheets together in a permanent unitary form.

One of the most commonly used forms of the improved heating element is the tape form illustrated in Figs. 1 to 9 inclusive. This form of the device can be quickly and cheaply made by a substantially continuous process and, because the resistance wires may extend continuously in the longitudinal direction of the tape and the heating capacity is substantially proportional to length, the total heat output of a heating unit or any particular size may be determined merely by lineal measure. Thus manufacture is greatly simplified as will be hereafter explained.

Figure 1:
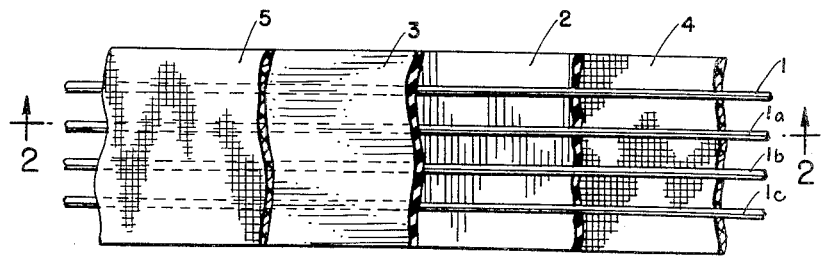
Figure 1 is a fragmentary plan view, with parts broken away, showing the construction of a heating tape made in accordance with our invention.
Figure 2:
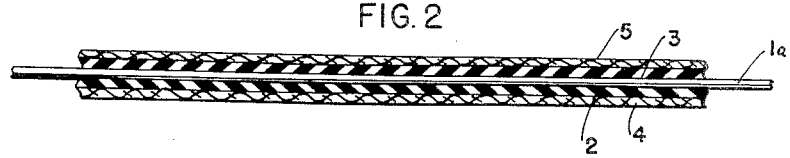
Fig. 2 is a longitudinal sectional view of a heating tape, as taken on line 2—2 of Fig. 1.

As shown in Fig. 1, the tape form of the improved heating element comprises a plurality of resistance wires 1, laid parallel with each other in uniform laterally spaced relation, between two sheets or strips of a suitable heat conducting dielectric material 2 and 3, which in turn are covered on their outer surfaces by sheets or strips of glass cloth 4 and 5. The dielectric strips 2 and 3 being of a partially cured rubber-like substance, such as silicone rubber, tend to adhere with each other and bond together around the resistance wires 1 when the strips are brought in face to face contact with each other, thereby forming a substantially unitary structure, which, when fully cured, may be handled in substantially any manner without fear of separation.

After the resistance wires and the insulating carrier strips have been brought together, a unit of predetermined length is cut and the resistance wires are then suitably connected together in series, as indicated in Fig. 5, and a connector plug is mounted on the end of the strip for providing electrical connection to a suitable conductor cord or cable for connection with a source of current supply.

As shown in Fig. 5, the tape form of heating unit constructed of the elements shown in Fig. 1, has its resistance wires connected together in series by means of small plates or bars of a suitable conductor material, such as "Nichrome" ribbon, laid transversely across each pair of wires to be connected, the conductor bars being suitably soldered to the resistance wires to provide a firm electrical connection. This connecting together of the resistance wires is accomplished by separating the ends of the rubber-like covering material at each end of a predetermined length of heating strip, so as to bare the resistance wires, and then cutting off the ends of the resistance wires to be bridged a short distance inside the ends of the insulating material so that the wires will be wholly enclosed. The conductor bars, or ribbon pieces, are then laid across respective pairs of the resistance wires, at the rearward end of the unit, and secured with a suitable resistance wire solder or soldering paste. Thus as shown in Fig. 5, the resistance wires 1 and 1a are connected by a conductor bar 6 and the resistance wires 1b and 1c are connected together by a conductor bar 7. At the opposite or forward end of the heating element, only the wires 1a and 1b are cut back from the end of the covering material, and these two wires are bridged by a soldered conductor bar 8. The outer wires 1 and 1c at the forward end of the element are thus left for connection to the leads of a suitable supply cord 9 so that a complete circuit through the several series connected resistance wires may be provided.

The preferred manner of connecting the ends of the resistance wires 1 and 1c to the respective leads of a conductor cord, is illustrated in Figs. 5 and 8, and as shown the connection is made by winding the end of the resistance wire 1 around a straight end portion of a heavy gage resistance wire 10, of about twice the diameter of the heating wire 1, and then winding the opposite end of the heavy gage resistance wire 10 about the end of a conductor wire 11, which has been previously tinned. The heavy resistance wire 10 is then soldered to the end of the conductor wire 11, by any suitable means, and the connection is then ready to be enclosed in a suitable connection block or housing, which may be made in two sections 12, as shown in Fig. 7.

As shown in Figs. 5, 6 and 7, the connection of the resistance wires to the supply conductor wires 11 is made so that the winding of the heating resistance wire 1 on the end of the heavy resistance wire 10 will be located within the end of the heating unit strip so that this junction will be enclosed between the two layers of insulating material, and only the junction of the heavy resistance wire 10 and the end of the conductor wire 11 will extend beyond the end of the insulating tape. The reason for this is to minimize the transfer of heat from the heating unit to the connector block.

The connector block may be of any suitable form adapted to be fastened directly to the end of the heating unit and providing separate internal channels in which the supply conductors 13 may be separately enclosed. One form of such a connector block is illustrated in Figs. 5, 6 and 7, and as shown each connector block section 12 is of like form having an entrance opening 14 at one end for the conductor cord 9, and a wide rectangular entrance opening 15 at the opposite end in which the end of the heating element may be received and secured. A pair of spaced channels 16, connecting the entrance opening 14 with the entrance opening 15 is provided for the separate conductor leads 13. Thus, when the two connector block sections 12 are mated face to face, the respective resistance wires and conductor leads connections will be housed in separate channels so as to be electrically insulated from each other. The connector block sections may then be secured together by suitable fasteners, such as the bolts 17, one of which passes through the end of the heating unit to secure the same against pulling out of the connector block. In this manner a complete heating unit is constructed, which may be connected in the usual manner with any suitable receptacle or electric current outlet, and which may be wrapped in any convenient manner around an article or vessel to be heated as illustrated in Fig. 9.

A material that has been successfully used for the construction of our improved heating sheet or tape is a glass cloth reinforced sheet or strip of semi-vulcanized silicone rubber now being manufactured and sold by Dow Corning Corporation, under the trade name "Silastic R" tape, which has high dielectric and chemical resistance properties, and which after completion of curing retains these properties at temperatures ranging from minus 70 degrees F. to 400 degrees F. This material is also an excellent heat conductor and with the glass cloth reinforcing layer on the outer side of the two strips or sheets which make up the heating unit, the material provides excellent resistance to damage from abusive use and contact with foreign materials.

Figure 3:
Fig. 3 is a similar view of a heating tape arranged to have a relatively cool outer or non-heating side.

In those cases where it is desired to provide some thermoinsulation on the outer side of the heating unit so as to confine the heat produced by the unit to the article or vessel about which the unit is wrapped, an extra layer of the glass cloth covered rubber material may be applied to one side of the unit as shown in Fig. 3, where the extra layers of insulating material and glass cloth are indicated by the numerals 18 and 19, respectively.

Figure 4:
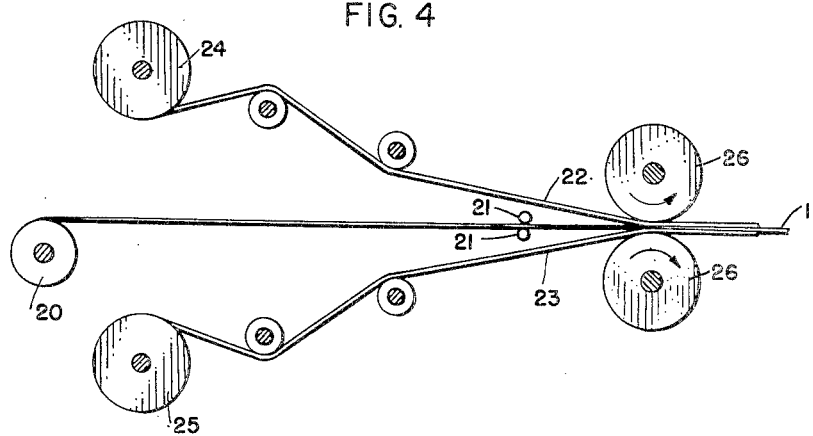
Fig. 4 is a diagrammatic view in elevation illustrating one manner of manufacturing the improved heating tape.

Fig. 4 illustrates one convenient manner of manufacturing a continuous strip or tape form of improved heating element. In this arrangement the resistance wires are run from spools 20, through guide rollers 21 and thence between a pair of tapes 22 and 23, which are led from suitable spools 24 and 25, between a pair of opposed pressure rolls 26. The tapes 22 and 23 comprise a layer of suitable rubber-like material, such as semi-cured silicone rubber, and a layer of glass cloth, the glass cloth layer being disposed so as to be on the outer sides of the tapes 22 and 23 as they are brought between the pressure rolls 26. The pressure rolls cause the semi-cured rubber surfaces of the two tapes 22 and 23 to adhere to each other and form around the resistance wire 1, so that a continuous unitary tape assembly is produced from which lengths of the assembly may be cut for series connection of the parallel resistance wires which they contain and for connection with a suitable connector block as illustrated in Figs. 5 and 6.

Once the assembly with the connector block is completed, the completion of curing or vulcanizing of the rubber-like material may be completed either by passing the assembly through a suitable heating oven or by energizing the resistance wires thereby generating sufficient heat to complete the curing action.

It will be understood that the improved heating element may be made either as narrow strips in the form of tapes, or in relatively wide strips in form of sheets. Also, the improved heating elements may be made in other forms, such as cones or hemispheres, to fit the contour of various kinds of vessels to which the heating elements may be applied. In this regard Fig. 10 illustrates an arrangement of a pair of hemispherical heating element shapes suitable for enclosing the body of a spherical vessel. In constructing the shapes such as those shown in Fig. 10, a mold is employed and a first layer of insulating material is built up on the mold by dipping into or brushing on a coating of suitable thickness of the insulating material in a liquid form. The resistance wires are applied on the outside of this first coating in any suitable manner, the ends of the resistance wires being terminated in a suitable connector block or plug 27 which is attached to the first coating in any convenient manner. A second coating of the rubber-like insulating material is then applied over the first coat, to thoroughly embed the resistance wires, and the assembly is then suitably cured by heating and stripped from the mold. If desired, the outer surface of the assembly may be wrapped with a layer of glass cloth to provide additional strength and body.

Figure 11:
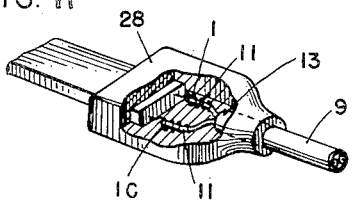
Fig. 11 is a perspective view partly broken away showing a form of molded means for permanent connection of the tape and conductor leads.

A modified form of connector block is shown in Fig. 11 whereby a permanent connection between the heating tape and its resistance wires is made with the main conductor leads. In this arrangement a solid connector block 28 is cast or molded over and around the wires, after they have been suitably connected to each other, and the ends of the tape and the insulated covering of the conductor cord 9 are included in the molded structure. Any suitable dielectric thermosetting plastic material may be used for this purpose as long as the material has sufficient strength to form a substantially solid connection which will withstand ordinary abuse and which will not pull away from either the tape or conductor cord. Also such a permanent connection may be made from a catalyst activated resin, such as an epoxy-resin.

In this arrangement of connector block the resistance wires 1 and 1e, of the heating tape, may be connected directly to the respective conductor leads 11, by soldering, since transfer of heat to the cast connector block 28 is not a detrimental factor. This assembly is then placed in a suitable mold, with the wires spaced from each other, and the connector block is cast so as to completely surround and embed each of the wire leads, the end of the tape, and a portion of the insulated conductor cord.

Particular advantages of this invention reside in the fact that the improved heating element or unit is very easy to manufacture of readily available material, and is hence cheaper to produce than the heating tapes or sheets heretofore provided. Other particular advantages reside in the fact that the temperature response of the improved heating unit is much quicker than that of other devices now available; the unit is substantially impervious to liquids, acids and other effects usually encountered in laboratory work; and the unit is much more rugged and abuse resistant. Further advantages are to be found in the fact that the improved heating unit is capable of a greater heat output, and hence higher temperatures than the devices presently used, and in the fact that when made of silicone rubber or its equivalent, the device is capable of use over a wide range of temperature conditions without physical deterioration.

Although but one specific embodiment of this invention is herein fully shown and described, it will be understood that details of the construction shown may be altered or omitted without departing from the spirit of this invention as defined by the following claims.

We claim:

1. An electrical heating element comprising a pair of strips of flexible dielectric material bonded together face to face in parallel relation and having a pair of longitudinally extending laterally spaced resistance wires sandwiched therebetween, said wires being connected together within the margins of said bonded strips to form an electrical circuit and having spaced terminal ends extending substantially to one end of the bonded strips, an extension of heavier gage resistance wire secured to each of said terminal ends within said one end of the bonded strips and projecting outwardly therebeyond, a conductor wire connected to the outwardly projecting portion of each extension, and a connector block having an opening at one end to receive the end of the bonded strips and having spaced channels for separately enclosing the junctions of said extensions and conductor wires, and means for securing the end of the bonded strips in said connector block.

2. In an electrical heating element comprising a pair of sheets of flexible dielectric material bonded together face to face and enclosing a circuit of resistance wire between the bonded sheet surfaces, said resistance wire having terminal ends adjacent each other and a margin of the heating element, an electrical input connection comprising a pair of resistance wire extensions, of heavier gage than the first mentioned wire, extending between the bonded sheets and electrically connected with respective ones of said terminal ends within the margin of the bonded sheets, said extensions projecting beyond the edge of the bonded sheets, a pair of electrical conductor wires each having an end electrically connected to the projecting end of a respective one of said extensions, and a connector block embracing and secured to the bonded sheet margin and enclosing said extensions and conductor wire ends.

3. In an electrical heating element comprising a pair of sheets of flexible dielectric material bonded together face to face and enclosing a circuit of resistance wire between the bonded sheet surfaces, said resistance wire having terminal ends adjacent each other and a margin of the heating element, an electrical input connection comprising a pair of resistance wire extensions of heavier gage than the first mentioned wire and each having a portion extending between the bonded sheets about which the end of a respective one of said terminal ends is spirally wound and secured, said extensions projecting outwardly beyond the margin of the bonded sheets, a pair of electrical conductor wires each having a bare end portion on which a respective one of the projecting extensions is spirally wound and secured, and a connector block having spaced channels for separately housing said conductor wires and the extension connections therewith, said connector block having portions embracing and secured to the margin of said bonded sheets.

4. The method of fabricating a heating tape which comprises feeding a pair of parallel laterally spaced resistance wires longitudinally between a pair of opposed pressure rolls while simultaneously feeding a pair of strips of semi-cured silicone rubber between said rolls, each from an opposite side of the plane of said wires and in face to face relation to sandwich said wires therebetween, and produce a unitary tape assembly severing a predetermined length of the tape assembly, separating the rubber strips at one end of the severed length and conductively bridging the exposed ends of said resistance wires within the margin of the separated end of said strips, replacing the separated ends of the rubber strips in face to face relation to enclose the bridged resistance wires, and then curing said rubber strips to seal the tape assembly.

References Cited in the file of this patent

UNITED STATES PATENTS

| | | |
|---|---|---|
| 1,384,467 | Homan | July 12, 1921 |
| 1,385,527 | Duer | July 26, 1921 |
| 2,386,095 | Edgar et al. | Oct. 2, 1945 |
| 2,503,457 | Speir et al. | Apr. 11, 1950 |
| 2,511,540 | Osterheld | June 13, 1950 |
| 2,548,468 | Crise | Apr. 10, 1951 |
| 2,559,077 | Johnson et al. | July 3, 1951 |
| 2,585,443 | Cox | Feb. 12, 1952 |
| 2,610,286 | Cox | Sept. 9, 1952 |
| 2,643,206 | Ford | June 23, 1953 |